(12) United States Patent
Moro et al.

(10) Patent No.: US 6,344,624 B1
(45) Date of Patent: Feb. 5, 2002

(54) WIRE ELECTRIC DISCHARGE MACHINE

(75) Inventors: Toshio Moro; Seiji Satou, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,744

(22) PCT Filed: Oct. 16, 1998

(86) PCT No.: PCT/JP98/04677

§ 371 Date: Jun. 16, 2000

§ 102(e) Date: Jun. 16, 2000

(87) PCT Pub. No.: WO00/23220

PCT Pub. Date: Apr. 27, 2000

(51) Int. Cl.⁷ .............................. B23H 7/02; B23H 1/10
(52) U.S. Cl. ...................... 219/69.12; 219/69.14
(58) Field of Search ................ 219/69.12, 69.14

(56) References Cited

U.S. PATENT DOCUMENTS

| | | | | |
|---|---|---|---|---|
| 3,553,415 A | * | 1/1971 | Girard | 219/69.14 |
| 4,414,456 A | * | 11/1983 | Inoue | 219/69.12 |
| 4,491,714 A | * | 1/1985 | Inoue | 219/69.14 |
| 4,564,431 A | * | 1/1986 | Miyano | 219/69.12 |
| 4,578,556 A | * | 3/1986 | Inoue | 219/69.14 |

FOREIGN PATENT DOCUMENTS

| | | |
|---|---|---|
| JP | 56-157928 | 12/1981 |
| JP | 58-22628 | 2/1983 |
| JP | 60-80525 | 5/1985 |
| JP | 61-103724 | * 5/1986 |
| JP | 61-134826 | 8/1986 |
| TW | 391901 | 6/2000 |

OTHER PUBLICATIONS

International Search Report.

* cited by examiner

*Primary Examiner*—Geoffrey S. Evans
(74) *Attorney, Agent, or Firm*—Sughrue Mion, PLLC

(57) ABSTRACT

There are provided an upper guide (118) and a lower guide (109) which are respectively disposed above and below a workpiece (25) and respectively incorporate wire guides for guiding a wire electrode (119); a nozzle for jetting and supplying a working fluid from at least one of the upper guide (118) and the lower guide (109) toward the workpiece (25); and a pump for supplying the working fluid to the nozzle, so that a gas is mixed into the working fluid in a channel of the working fluid from the pump to the nozzle, and the working fluid in a state of a gas-liquid mixed phase is jetted and supplied from the nozzle to the workpiece (25).

4 Claims, 8 Drawing Sheets

TO LOWER GUIDE

A-A SECTION

B-B SECTION

WIRE ELECTRIC DISCHARGE MACHINE

TECHNICAL FIELD

The present invention relates to improvements in a wire electrical discharge machining apparatus which is capable of improving the machining speed and machining accuracy.

BACKGROUND ART

Referring to FIGS. 5 to 8, a description will be given hereafter of the configuration and operation of a conventional wire electrical discharge machining apparatus.

FIG. 5 shows an overall configuration of mechanical portions, in which reference numeral 101 denotes a bed as a base of machine, and numeral 102 denotes an X-axis table. The X-axis table 102 is supported by an X-axis guide 103 on the bed 101, and is driven in the X-direction by an unillustrated X-axis motor through an X-axis ball screw 104. Numeral 105 denotes a table for fixing a workpiece 25, which is fixed on the X-axis table 102. Numeral 106 denotes a processing tank for storing a working fluid. Numeral 107 denotes a column for supporting a Z-axis unit 117, and a lower arm 108 is fixed thereto. A lower guide 109 is attached to a distal end portion of this lower arm 108. Numeral 118 denotes an upper guide, which is fixed to a distal end portion of the Z-axis unit 117. Numeral 111 denotes a Y-axis guide on the bed 101 which supports the column 107. The column 107 is driven in the Y-direction by a Y-axis motor 113 through a Y-axis ball screw 112. Numeral 114 denotes a wire collector for supporting a roller 115 for collecting a wire electrode, and the collected wire electrode is accommodated in a collecting box 116. Numeral 120 denotes a wire bobbin, numeral 121 denotes a pad disposed underneath the bed 101, and numeral 122 denotes a leveling bolt for adjusting inclination.

FIG. 6 is a cross-sectional view illustrating the configuration of the lower guide 109. The lower guide 109 is fixed to a distal end of the lower arm 108 through an insulating plate 2, and is mainly comprised of a nozzle 6, an electric supply die 16, a lower wire guide holder 12, a guide supporting plate 23, and a lower block 3. The lower block 3 includes a roller 19 which functions to convert the direction of the wire electrode, and has a wire inlet 3a and a wire outlet 3b which are tapered. A collection pipe 20 is connected at the wire outlet 3b. The guide supporting plate 23 incorporates the electric supply die 16, and also incorporates a withdrawing plate 17 for withdrawing the electric supply die 16. The electric supply die 16 is fixed by a holding plate 15. Numeral 18 denotes a lower auxiliary guide, and the lower auxiliary guide 18, together with the lower wire guide holder 12, presses a wire electrode 119 against the electric supply die 16 so as to supply electricity to the wire electrode 119. The nozzle 6 is a portion for jetting the working fluid, and the working fluid is supplied through a pipe 9 as a high-pressure fluid. Numeral 14 denotes a spring, and 13 denotes a holding plate for the nozzle 6. The nozzle 6 during machining is raised while compressing the spring 14, is stopped by the holding plate, and is returned downward when the working fluid ceases to be supplied. As a result, when machining is not being effected, the nozzle is lowered, thereby preventing its useless contact with the workpiece. A rectifying plate 22 has the function of rectifying the turbulence of the working fluid inside the nozzle, and a multiplicity of small holes 22a are provided therein. Numeral 10 denotes the wiring, which is connected to the guide supporting plate 23 formed of an electrically conductive material, so as to supply machining electric power from an unillustrated machining power supply to the electric supply die 16. Numeral 24 denotes a lower transporting-current jetting hole, to which a pipe from the outside is connected and which functions to transport the wire electrode 119 in the collection pipe 20 to the collection roller 115 (see FIG. 5), and is used mainly during the initial setting of the wire electrode 119. Numeral 26 denotes a machining gap between the workpiece 25 and the wire electrode 119, and this gap is referred to as the gap between the electrodes. The working fluid jetted from the nozzle 6 is supplied to the gap 26 between electrodes. The principal functions of the working fluid are to discharge the machining sludge produced during machining, to prevent the overheating of the wire electrode, and to prevent the disconnection of the wire electrode during machining.

FIG. 7 is a cross-sectional view illustrating the configuration of the upper guide 118. An attaching plate 225 fixes the upper guide 118 to the Z-axis unit 117 and is formed of an insulating material. An upper block 226 has a passage 226a, and an upper auxiliary guide 229 for guiding the wire electrode 119 is disposed on top of the upper block 226. An electric supply die 46 is accommodated in the interior of the upper block 226, and is pressed toward the wire electrode 119 by a pressing plate 230. The arrangement provided is such that the insertion and withdrawal of the electric supply die 46 are made possible by a withdrawing plate 47. An upper wire guide holder 236 is fixed to a lower end of the upper block 226, and a wire guide 236a is fixed to a distal end portion of the upper wire guide holder 236. Further, a housing 234 is provided in such a manner as to cover the upper wire guide holder 236, and a nozzle 232 is disposed on the outer side thereof. A jet nozzle 233, which is supported in such a manner as to be vertically movable through a spring 235, is accommodated inside the housing 234.

When the working fluid is supplied to a jet pipe 238, the jet nozzle 233 moves downward by its pressure while pressing the spring 235, and jets out a jet stream 239 through a jetting hole 233a in the jet nozzle 233. The wire electrode 119 passes through the interior of the jet stream 239, and is guided to the lower guide located therebelow. During normal machining, the working fluid is supplied from a working fluid pipe 237, and the working fluid is supplied from a jetting hole 232a in the nozzle 232. In addition, during normal machining, the jet nozzle 233 is retracted upward from the spring 235. Numeral 221 denotes a cooling hole through which the working fluid is guided into the interior of the upper wire guide holder 236 to cool the wire electrode 119 during machining. Numeral 234a denotes a fixing throttle which is used to rectify the disturbance of the working fluid supplied from the working fluid pipe 237.

The wire electrical discharge machining apparatus is cooled by the working fluid because a large electric current flows across the contacting portions of the wire electrode and the electric supply die, and the temperature of these portions becomes high, possibly resulting in the disconnection of the wire electrode. The cooling working fluid is supplied to the wire passage 226a from the cooling hole 221 provided in the upper wire guide holder 236 by making use of the back pressure within the nozzle 232. The working fluid rises upward from the cooling hole 221 through the interior of the wire passage 226a, passes the contacting portions of the wire electrode 119 and the electric supply die 46, passes the upper auxiliary guide 229, and is discharged to the outside. Thus, as the working fluid passes, cooling is effected by absorbing Joule heat produced in the contacting portions of the wire electrode and the electric supply die.

Next, referring to FIG. 8, a description will be given of the arrangement of the wire electrode and a machining groove during machining. It is assumed that machining is being effected while maintaining a fixed gap in the direction toward the machining/advancing direction in the drawing. Jet streams 240 jet out from the upper and lower nozzles as indicated by the arrows, An come into contact with each other substantially in the vicinity of the center in the vertical direction of the workpiece 25, and flow toward a groove 26b located rearwardly in the machining direction.

If the machining speed is increased, the amount of machining sludge which is discharged increases, and when the production and discharge of the machining sludge fail to balance, the gap between the electrodes become contaminated, which causes the resistance at the machining gap to decline and increases the machining groove, with the result that the machining accuracy declines. In this case, it is conceivable to increase the pressure of the working fluid to promote the discharge of the machining sludge, but if the pressure of the working fluid is increased, the linear velocity of the working fluid between the wire electrode and the workpiece becomes high, so that there are cases where the working fluid is removed from side walls of the workpiece and the wire electrode, causing a hindrance to machining. Namely, if the working fluid is removed from the side walls of the workpiece and the wire electrode, the working electric current ceases to flow stably, and can cause the disconnection of the wire electrode. Thus, there is a limit to increasing the pressure of the working fluid.

In addition, to improve the accuracy, it is necessary to lower the concentration of the machining sludge by removing the contamination at the machining gap and to effect machining with a narrow gap by increasing the specific resistance of the working fluid. However, there are problems in that to increase the specific resistance results in large consumption of an ion exchange resin and is uneconomical, and that the amount of substances discharged from the wire electrical discharge machining apparatus to the outside increases.

As described above, with the conventional wire electrical discharge machining apparatus, the compatibility of improvement of the machining speed and improvement of the machining accuracy is extremely difficult.

DISCLOSURE OF THE INVENTION

The present invention has been made to overcome the above-described problems, and its object is to obtain a wire electrical discharge machining apparatus which is capable of realizing the improvement of the machining speed and the machining accuracy.

A wire electrical discharge machining apparatus according to a first aspect of the invention comprises: an upper guide and a lower guide which are respectively disposed above and below a workpiece and respectively incorporate wire guides for guiding the wire electrode; a nozzle for jetting and supplying a working fluid from at least one of the upper guide and the lower guide toward the workpiece; and a pump for supplying the working fluid to the nozzle, wherein a gas is mixed into the working fluid in a channel of the working fluid from the pump to the nozzle, and the working fluid in a state of a gas-liquid mixed phase is jetted and supplied from the nozzle to the workpiece.

As for a wire electrical discharge machining apparatus according to a second aspect of the invention, in the wire electrical discharge machining apparatus according to the first aspect of the invention, the nozzle is constructed with a double structure, the working fluid in the state of the gas-liquid mixed phase is jetted out from an internal nozzle, and the working fluid in which the gas is not mixed is jetted out from an external nozzle.

A wire electrical discharge machining apparatus according to a third aspect of the invention comprises: an upper guide and a lower guide which are respectively disposed above and below a workpiece and respectively incorporate wire guides for guiding the wire electrode; a nozzle for jetting and supplying a working fluid from at least one of the upper guide and the lower guide toward the workpiece; and a pump for supplying the working fluid to the nozzle, wherein a gas is mixed into the working fluid on an upstream side of the pump, and the working fluid in a state of a gas-liquid mixed phase is jetted and supplied from the nozzle to the workpiece.

As for a wire electrical discharge machining apparatus according to a fourth aspect of the invention, in the wire electrical discharge machining apparatus according to the third aspect of the invention, the nozzle is constructed with a double structure, the working fluid in the state of the gas-liquid mixed phase is jetted out from an internal nozzle, and the working fluid in which the gas is not mixed is jetted out from an external nozzle.

A wire electrical discharge machining apparatus according to a fifth aspect of the invention comprises: an upper guide and a lower guide which are respectively disposed above and below a workpiece and respectively incorporate wire guides for guiding the wire electrode; a nozzle for jetting and supplying a working fluid from at least one of the upper guide and the lower guide toward the workpiece; and a pump for supplying the working fluid to the nozzle, wherein a gas is mixed into the working fluid inside a cooling container disposed on an upstream side of the pump, and the working fluid in a state of a gas-liquid mixed phase is jetted and supplied from the nozzle to the workpiece.

As for a wire electrical discharge machining apparatus according to a sixth aspect of the invention, in the wire electrical discharge machining apparatus according to the fifth aspect of the invention, the nozzle is constructed with a double structure, the working fluid in the state of the gas-liquid mixed phase is jetted out from an internal nozzle, and the working fluid in which the gas is not mixed is jetted out from an external nozzle.

BEST MODE FOR CARRYING OUT THE INVENTION

First Embodiment

Figure 1A:
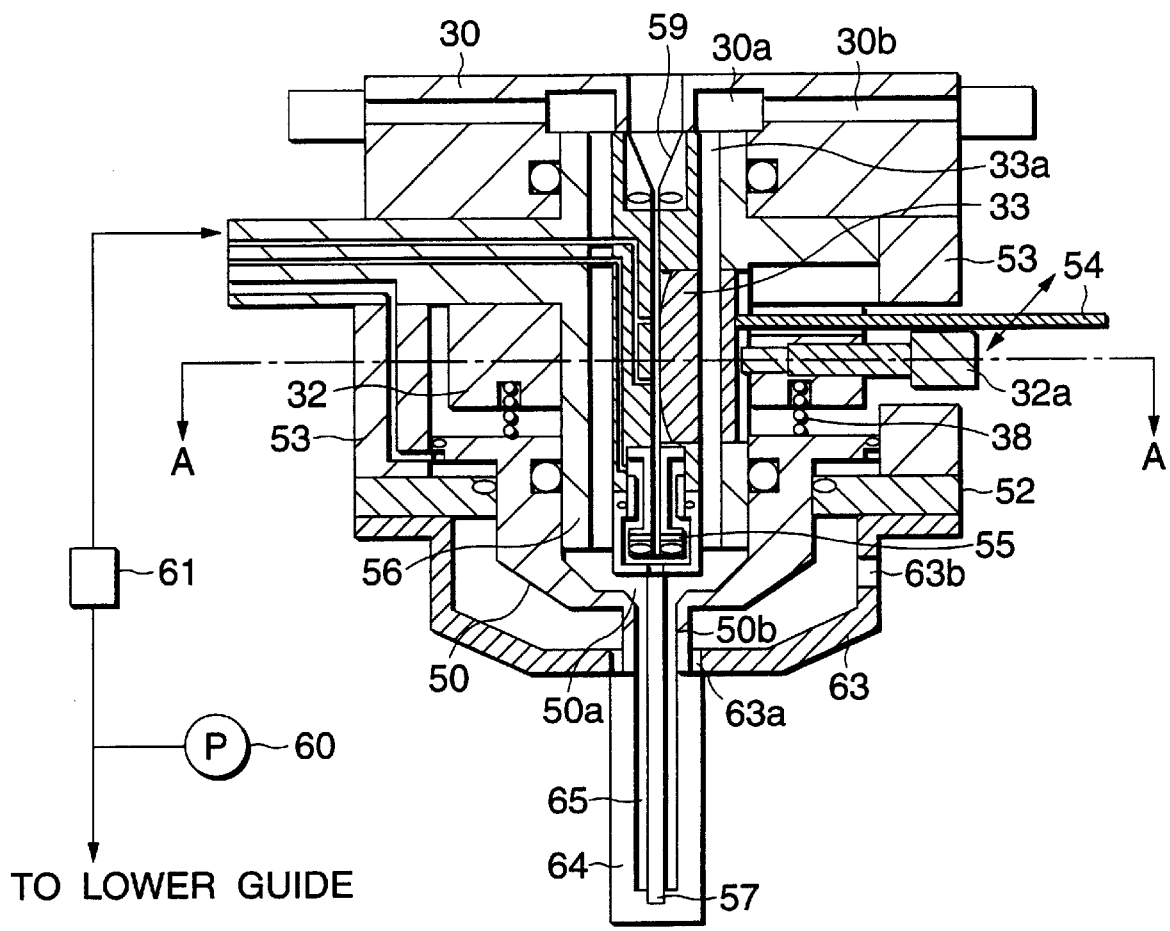
FIG. 1(A) and FIG. 1(b) are cross-section views of an upper guide according to a first embodiment of the invention.
Figure 1B:
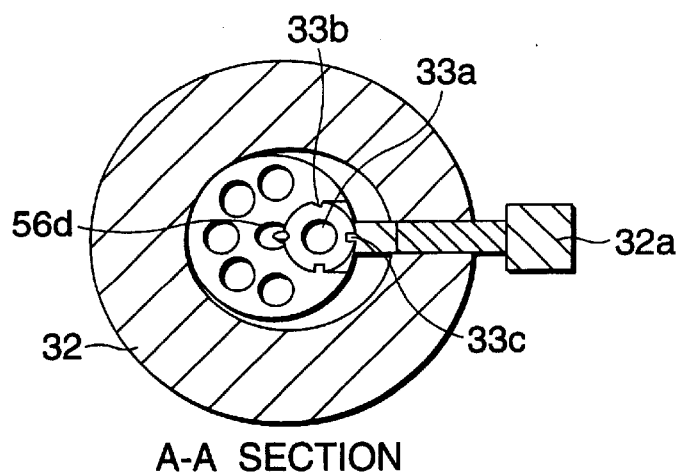
Figure 2:
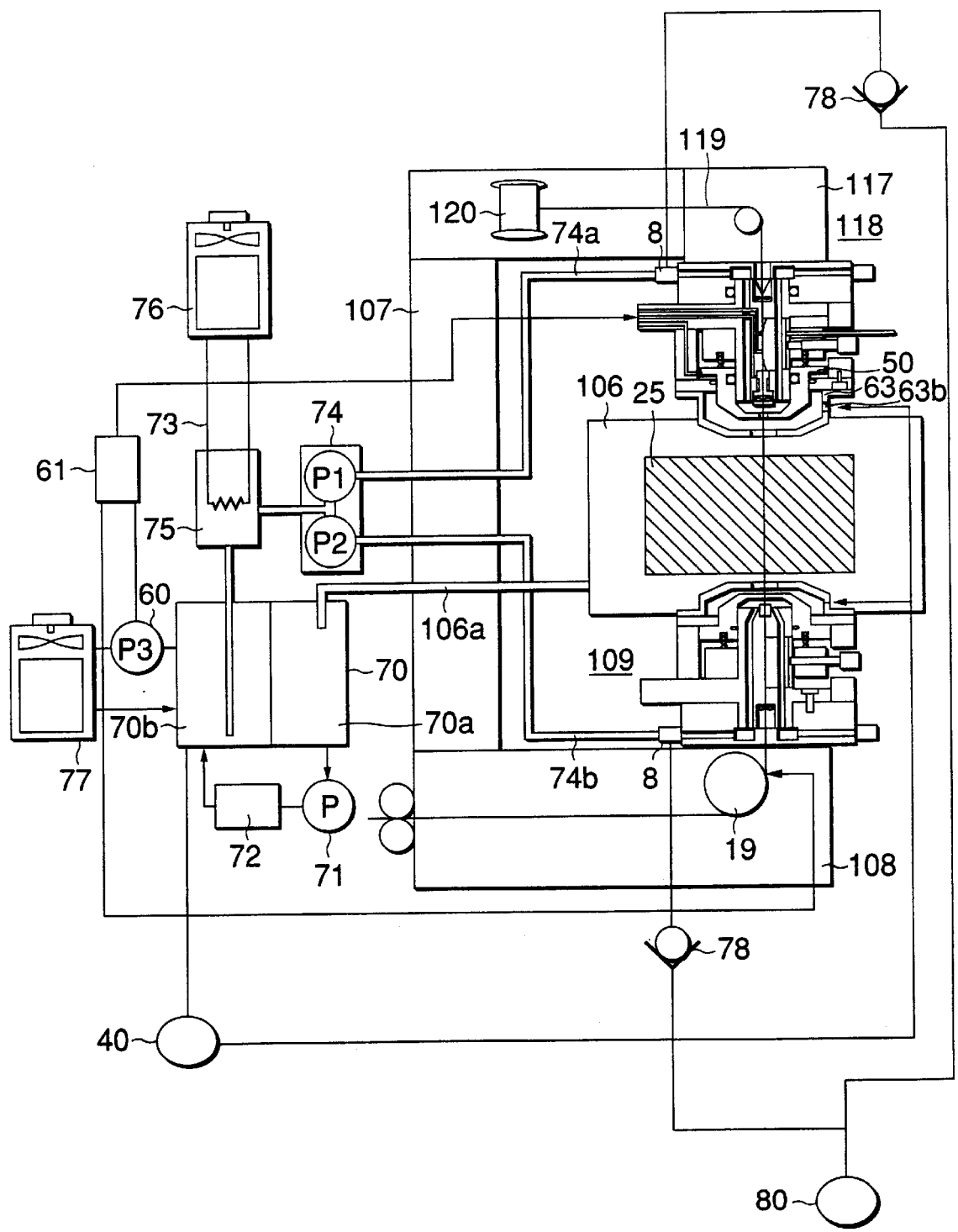
FIG. 2 is an overall schematic view illustrating the first embodiment of the invention.
Figure 3A:
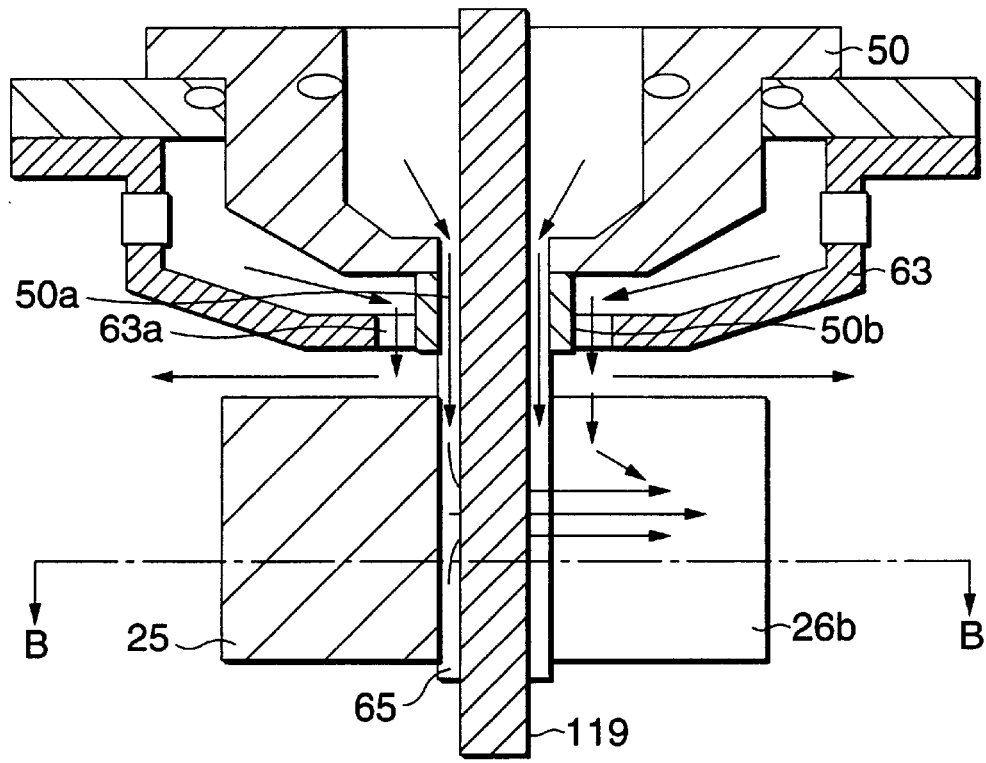
FIG. 3(A) and FIG. 3(b) are explanatory diagrams of a state in which a working fluid jets out according to the first embodiment of the invention.
Figure 3B:
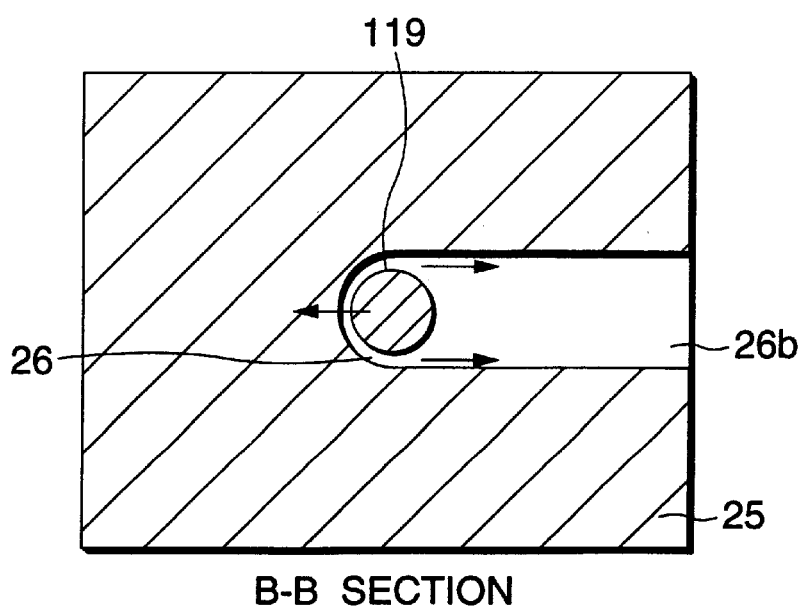

Referring now to FIGS. 1 to 3, a description will be given of the configuration and operation of the wire electrical discharge machining apparatus according to a first embodiment of the invention.

FIG. 1 shows a cross section of an upper guide, in which pipelines 30b provided inside a supporting plate 30 are connected to a pipe for a working fluid supplied from the outside, and is connected from four directions toward a pool 30a disposed in the vicinity of the center. A guide holder 56 is fixed to a lower end face of the supporting plate 30. The guide holder 56 has a hole in which an electric supply die 33 is fitted, and has in its central portion a passage 56d for a wire electrode. The passage 56d of the wire electrode is a rectilinear pipeline passing through the interior of the guide holder 56, and an outlet in its lower end communicates with a jetting hole 50a. Reference numeral 59 denotes an auxiliary guide for the wire electrode, which is disposed at an upper end, and a wire guide 55 is disposed in a lower portion. Numeral 32 denotes a doughnut-shaped ring which is movably disposed on the outer side of the guide holder 56, and numeral 32a denotes a bolt for pressing the electric supply die 33. An internal nozzle 50 has an outer periphery formed in a flange shape, and that portion is engaged with a stopper 52, and the stopper 52 is fixed to the supporting plate 30 by means of a side plate 53. Numeral 38 denotes a spring which is interposed between the internal nozzle 50 and the ring 32, and acts in such a manner as to press the internal nozzle 50 downward. When moving in the vertical direction, the internal nozzle 50 is fitted to an outer peripheral portion of the guide holder 56, and the leakage of the working fluid is prevented by an O-ring. The electric supply die 33 has a pipeline 33a in its central portion, has a contact electric supply portion 33b with respect to the wire electrode, and has on its side opposite to the contact electric supply portion 33b a groove 33c for rotating the electric supply die 33 itself from the outside by a lever 54 and the like. The supply of electricity is effected while the wire electrode and the electric supply die 33 are brought into contact with each other in a state in which the contact electric supply portion 33b of the electric supply die 33 is located at a position in which it is pushed in so that the wire electrode moves 1 mm or thereabouts toward the left-hand side in the drawing from a straight line connecting the center of the wire guide 55 and the center of the auxiliary guide 59.

An external nozzle 63 is provided on the outer side of the internal nozzle 50. An jetting port 50b is provided in a distal end portion of the internal nozzle 50 in such a manner as to overlap with a jetting hole 63a in the external nozzle, and the working fluid supplied from a connecting hole 63b in the external nozzle jets out from outside the jetting port 50b through the jetting hole 63a. Numeral 65 denotes a high-pressure jet stream jetted out from the internal nozzle 50, and has a slightly larger diameter than a jet stream 57. Numeral 64 denotes a low-pressure jet stream jetted out from the external nozzle 63, and has a slightly larger diameter than the aforementioned high-pressure jet stream 65. The working fluid is jetted out toward the workpiece in the form of a coaxial stream from the external nozzle 63 and the internal nozzle 50 during machining.

Since the lower guide is configured in the same way as the above-described upper guide, a description thereof will be omitted.

FIG. 2 is an overall schematic view, and an upper guide 118 and a lower guide 109 are respectively provided in an upper section and a lower section of the machine body. Numeral 106 denotes a processing tank for storing the working fluid, and the working fluid is connected in a working fluid tank 70 by a pipe 106a and is recirculated. The working fluid tank 70 is comprised of a contaminated fluid tank 70a for temporarily storing the working fluid contaminated by the machining sludge after machining, as well as a clean fluid tank 70b for storing the working fluid filtered by a filter 72. Numeral 71 denotes a filtering pump. Numeral 40 denotes a pump for supplying the working fluid in the clean fluid tank 70b to the connecting hole 63b in the external nozzle 63. Accordingly, the low-pressure jet stream of the working fluid jets out from the external nozzle 63. The pump 60 recirculates and supplies the working fluid to a cooler 77 and serves to maintain the working fluid at a fixed temperature and supplies the working fluid to a flowrate control valve 61 as well. Numeral 75 denotes a cooling tank, which is connected to the clean fluid tank 70b of the working fluid tank 70. The cooling of the working fluid is effected by a cooler 76 through a cooling pipe 73. The cooled working fluid is supplied to the upper guide 118 and the lower guide 109 by a pump 74 through pipes 74a and 74b. The high-pressure fluid connected by a pipe end 8 passes through the pipeline 30b (see FIG. 1), and is jetted out from the jetting hole 50a (see FIG. 1) in the internal nozzle 50 in the form of a high-pressure jet stream. Also, the same applies to the lower guide. Numeral 78 denotes a delivery valve, which is interposed between the pipe end 8 and a compressor 80 to prevent the back flow of the working fluid. A high-pressure gas is supplied from the compressor 80, and is mixed with the working fluid in the pipe end 8, so that the interior of the pipe is set in a state of gas-liquid mixed phase. The working fluid in this gas-liquid mixed phase is jetted out from the internal nozzle 50 toward the workpiece.

Referring to FIG. 3, a description will be given of the jetting state of the working fluid. The high-pressure jet stream from the internal nozzle 50 is in the state in which the gas and the liquid are mixed as described above, and flows along the center of the low-pressure jet stream. Since bubbles are mixed in the working fluid in the gas-liquid mixed phase, its specific resistance becomes remarkably larger than the liquid, so that its insulating properties improve. For this reason, it becomes possible to maintain the specific resistance between the electrodes at a fixed level without using the ion exchange resin, and to narrowly set the machining gap, thereby making it possible to substantially improve the machining accuracy.

In addition, since the distraction of the working fluid remarkably progresses in the state of the gas-liquid mixed phase, and forms disturbance, the removal of the working fluid from the side walls of the workpiece and the wire electrode can be overcome.

Further, since the viscosity drops substantially as a characteristic of the gas-liquid mixed phase stream, the flow rate becomes high, the effect of discharging the machining sludge is promoted to allow machining to progress stably, and the working electric current can be increased, so that the machining speed can be improved substantially.

Moreover, the rate of heat transfer at the wire electrode surface improves substantially in the state of turbulence, so that the wire electrode itself is cooled, and its temperature is lowered. Therefore, it is possible to suppress the disconnection of the wire electrode during machining, and further improve the machining speed.

Second Embodiment

Figure 4:
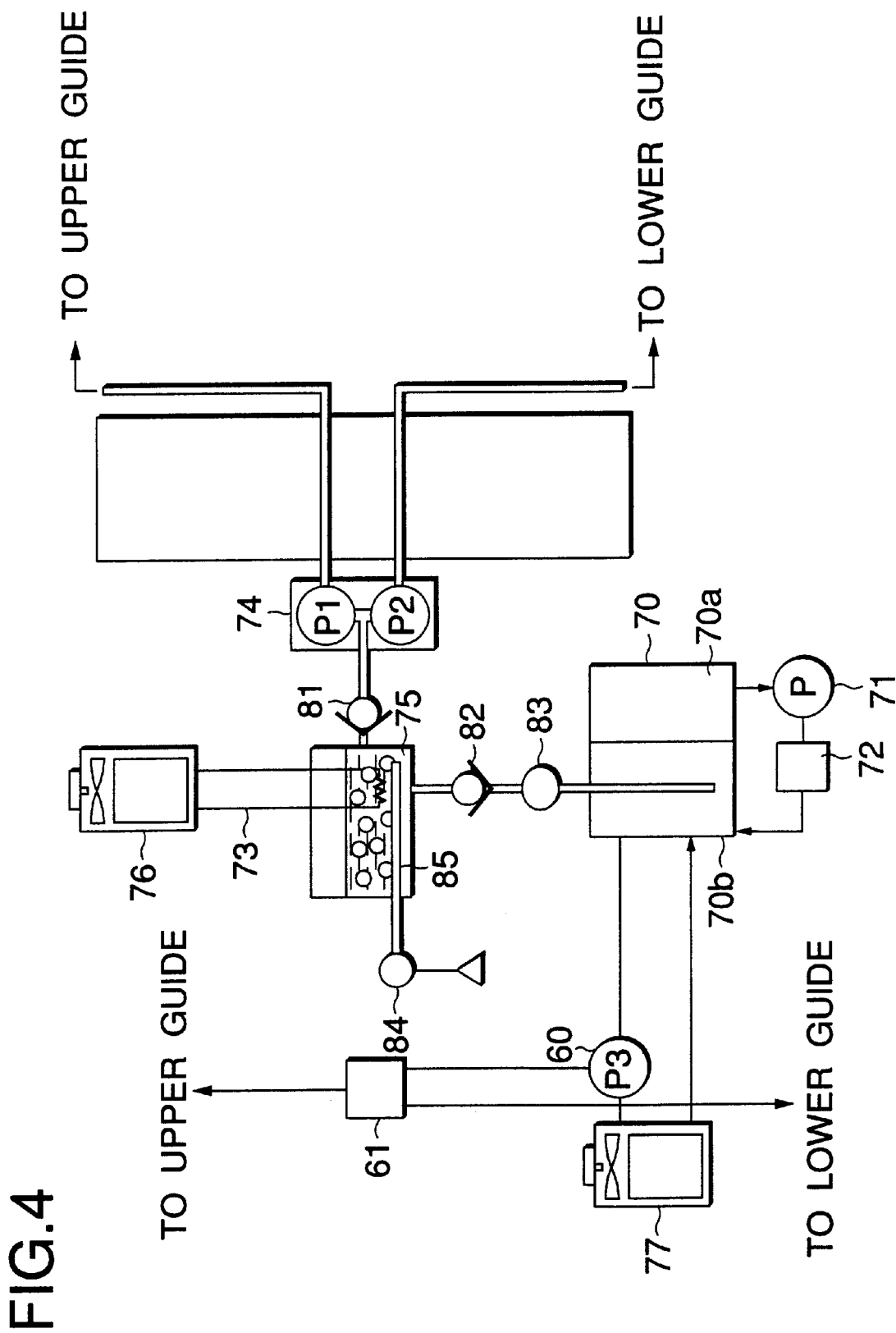
FIG. 4 is a schematic diagram illustrating a second embodiment of the invention.
Figure 5:
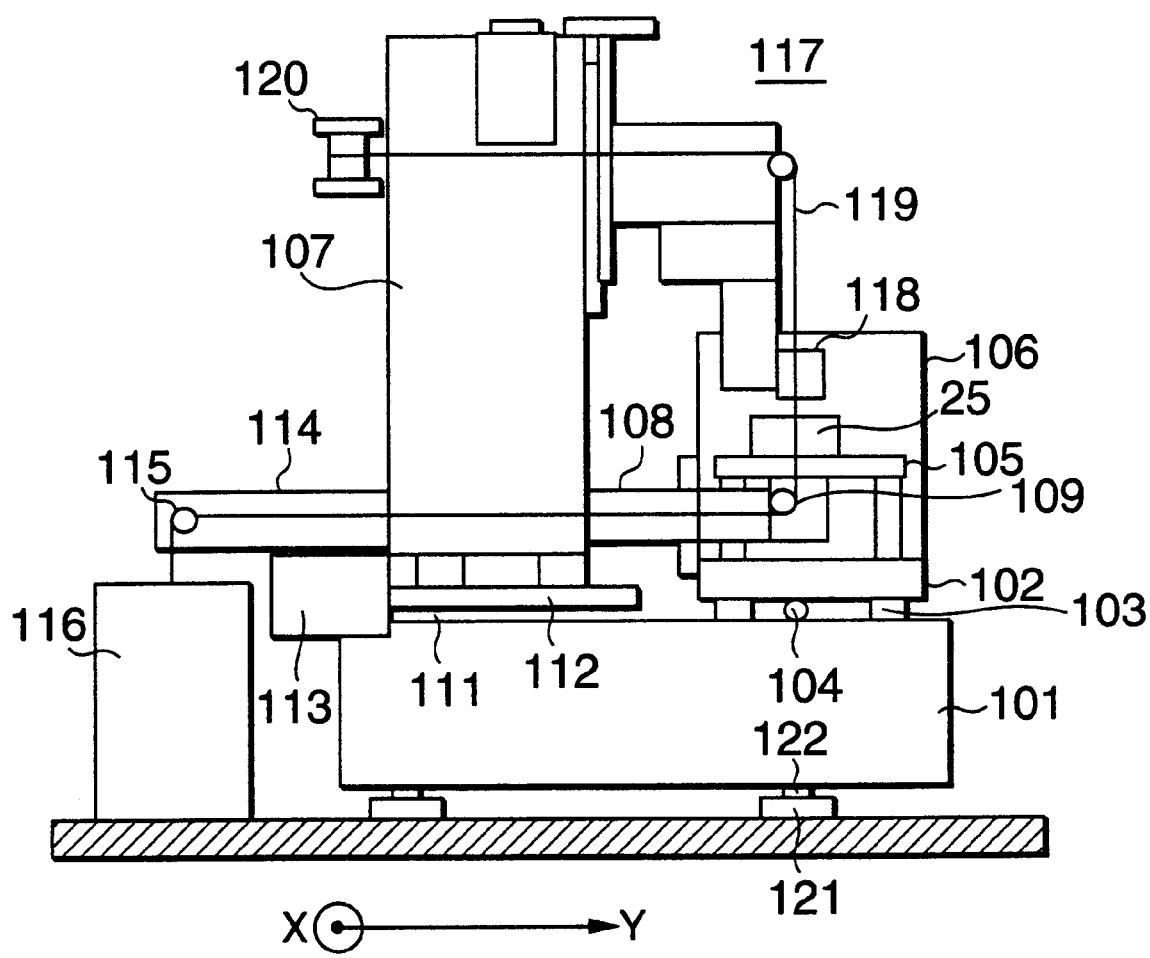
FIG. 5 is an overall schematic view of mechanical portions of a conventional wire electrical discharge machining apparatus.
Figure 6:
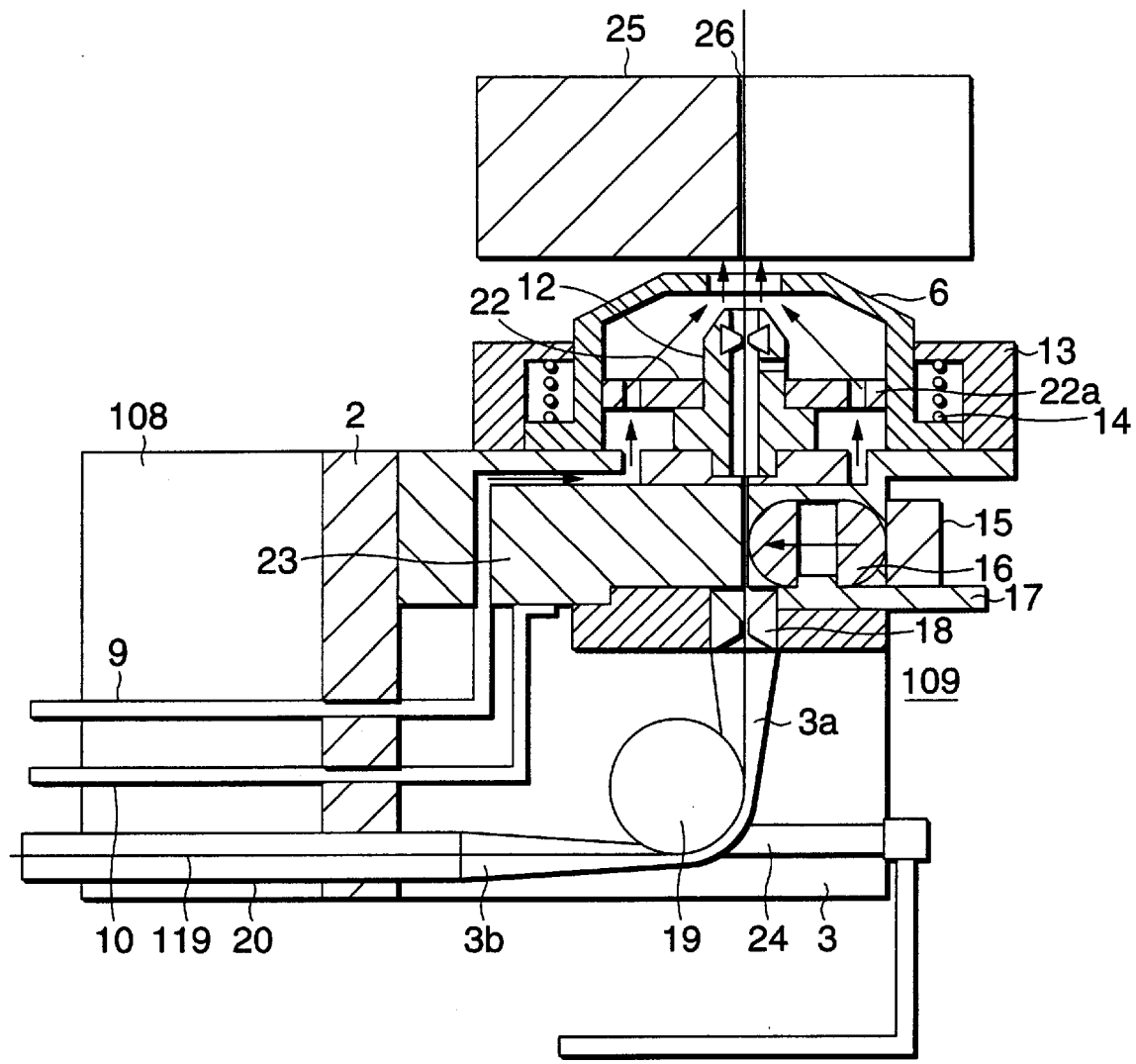
FIG. 6 is a cross-sectional view of a lower guide of the conventional wire electrical discharge machining apparatus.
Figure 7:
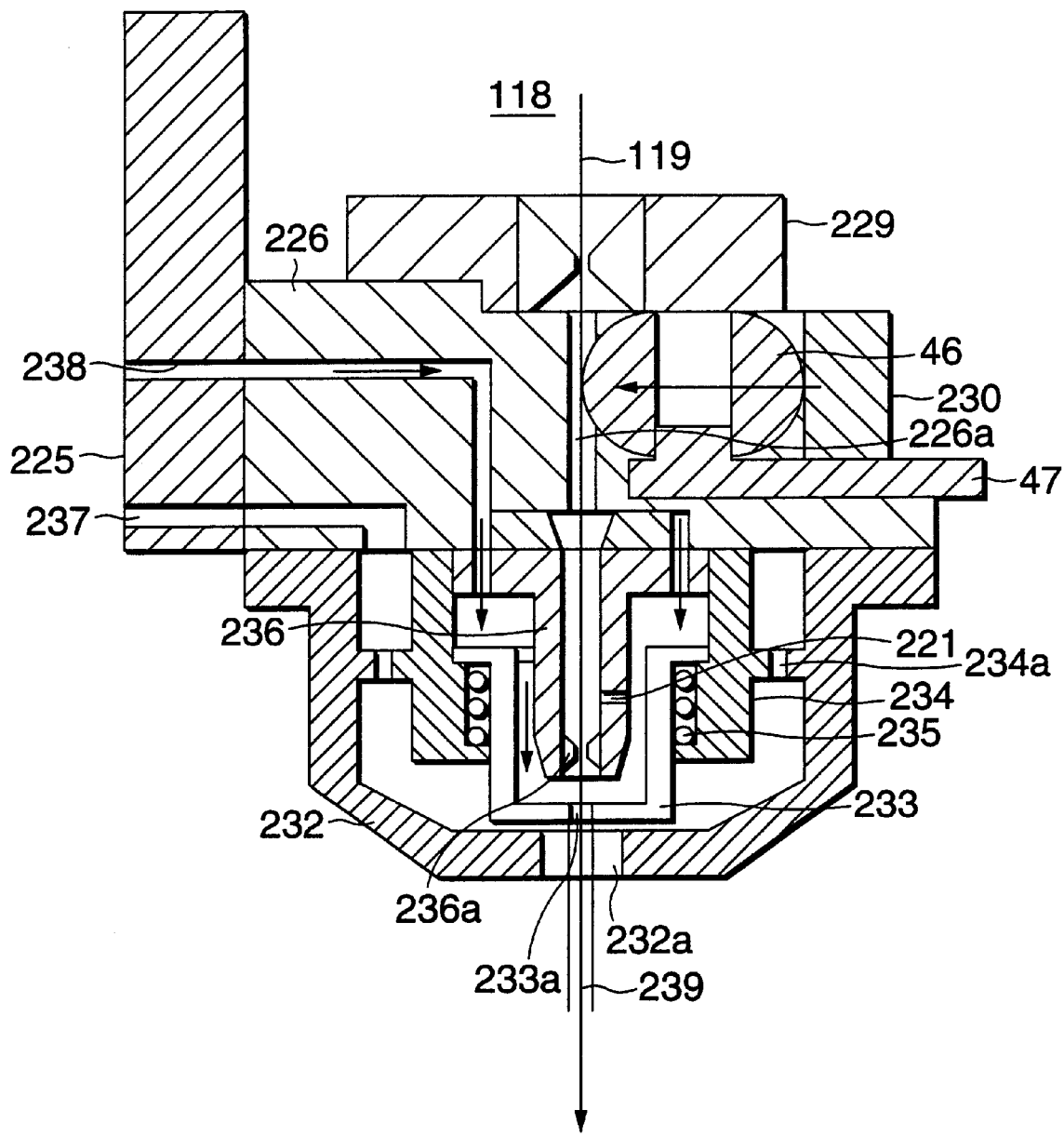
FIG. 7 is a cross-sectional view of an upper guide of the conventional wire electrical discharge machining apparatus.
Figure 8:
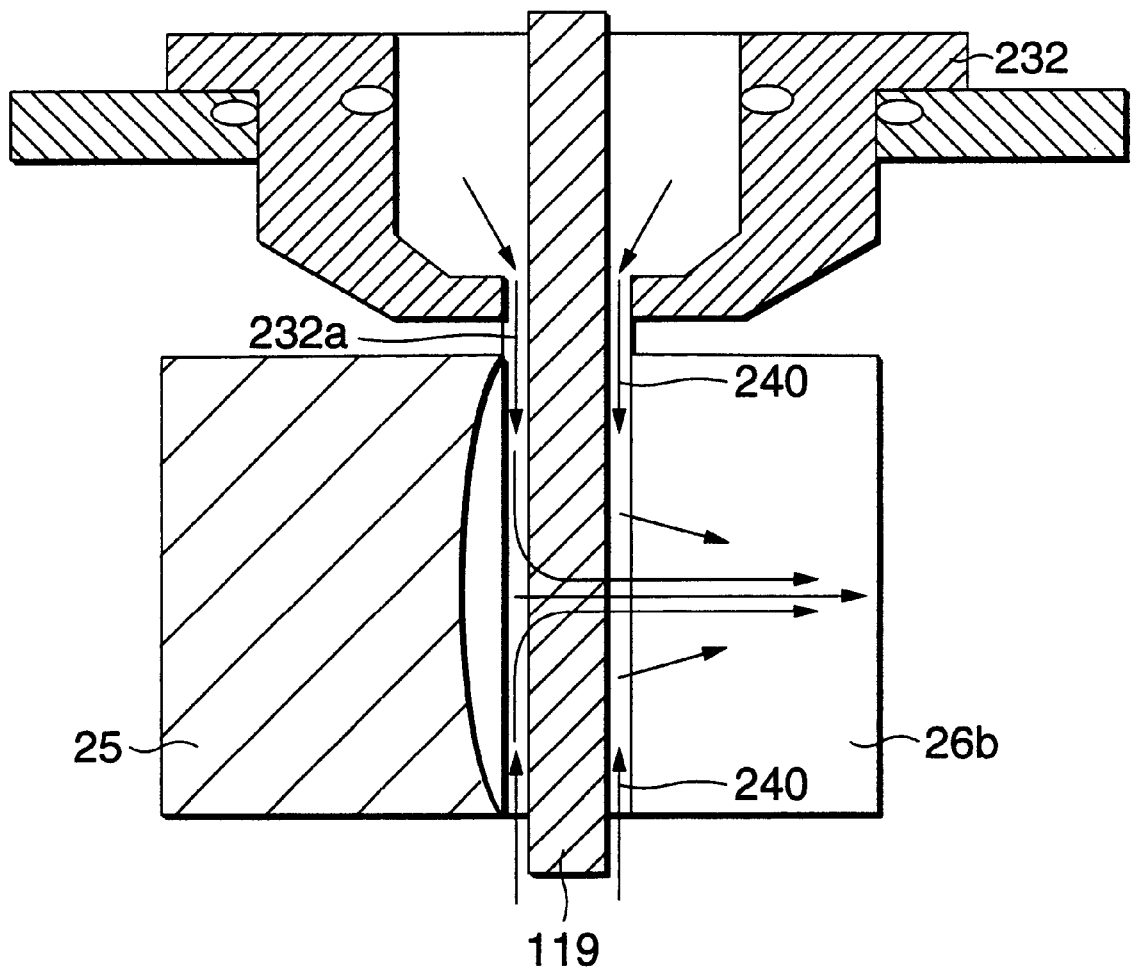
FIG. 8 is a diagram explaining the arrangement of a wire electrode and a machining groove during machining in the conventional wire electrical discharge machining apparatus.

FIG. 4 is a schematic diagram illustrating a second embodiment of the invention. Numeral 70 denotes the working fluid tank, and the working fluid in the working fluid tank 70 is pressurized by a pump 83. Numerals 81 and 82 respectively denote delivery valves, which are necessary for maintaining the internal pressure of the working fluid tank 70. Further, the working fluid in the working fluid tank 70 is maintained at a low temperature by the cooler 76. A gas is supplied from a pump 84, and small bubbles jet out into the liquid through bubble pipe 85. The gas which is supplied may be air, or carbon dioxide gas may be supplied from a gas cylinder. Generally, a gas under high pressure and at a low temperature easily dissolves in a liquid. The working fluid in which the gas is sufficiently dissolved is supplied to the upper guide and the lower guide by the pump 74. The working fluid is transported in the liquid state up to the interior of the nozzle, and is released to the atmospheric pressure in the process of being jetted out from the nozzle. Hence, the pressure drops suddenly, and the so-called total head is converted to the velocity head. At this time, the gas dissolved in a large quantity in the working fluid appears in the form of bubbles, and a gas-liquid mixed-phase fluid, in which fine bubbles are mixed, jets out into the machining gap.

In the process in which the gas is released to the atmospheric pressure, adiabatic expansion occurs, so that there is the effect of absorbing the surrounding heat, and at the same time there is the effect of cooling the wire electrode itself. In addition, the flow rate improves remarkably by the expansion of the gas, and the effect of discharging the machining sludge is also promoted, so that the machining speed can be improved substantially. Additionally, there is no need to mix the gas midway in the direct piping from the pump to the nozzle, so that it is possible to simplify the apparatus.

The wire electrical discharge machining apparatus according to the first to sixth aspects of the invention is capable of realizing the improvement of the machining speed and the machining accuracy since the working fluid in the state of the gas-liquid mixed phase is jetted and supplied to the workpiece.

In the wire electrical discharge machining apparatus according to the fifth aspect of the invention, a gas is dissolved into the working fluid inside a cooling container, this working fluid is transported in its liquid state up to the interior of the nozzle, and the working fluid in the form of the gas-liquid mixed-phase fluid is jetted out from the nozzle. Therefore, in addition to the aforementioned advantages, there is an advantage in that the wire electrode itself can be cooled by adiabatic expansion. In addition, there are advantages in that the flow rate improves remarkably by the expansion of the gas, and that the effect of discharging the machining sludge is also promoted, so that the machining speed can be improved substantially. Additionally, there is no need to mix the gas midway in the direct piping from the pump to the nozzle, so that there is an advantage in that it is possible to simplify the apparatus.

In the wire electrical discharge machining apparatus according to the second, fourth, and sixth aspects of the invention, the nozzle is constructed with a double structure, the working fluid in the state of a gas-liquid mixed phase is jetted out from the internal nozzle, and the working fluid in which the gas is not mixed is jetted out from the external nozzle, the gas-liquid mixed-phase stream concerning machining is concentrated in the gap between the electrodes, and the workpiece is cooled by the low-pressure jet stream supplied in a large quantity from the external nozzle. Therefore, since machining is not effected with the workpiece immersed in the working fluid, and machining can be effected in a state in which the working fluid is sprayed, in addition to the above-described advantages there is an advantage in that the overall apparatus can be manufactured economically.

Industrial Applicability

As described above, the wire electrical discharge machining apparatus according to the invention is suitable for use in wire electrical discharge machining operations since it is capable of improving the machining speed and the machining accuracy.

What is claimed is:

1. A wire electrical discharge machining apparatus in which a working fluid is interposed between a wire electrode and a workpiece to machine the workpiece by electrical discharge, comprising:

an upper guide and a lower guide which are respectively disposed above and below the workpiece and respectively incorporate wire guides for guiding said wire electrode;

a nozzle for jetting and supplying the working fluid from at least one of said upper guide and said lower guide toward the workpiece; and a pump for supplying the working fluid to said nozzle, wherein a gas is mixed into the working fluid on an upstream side of said pump, and the working fluid in a state of a gas-liquid mixed phase is jetted and supplied from said nozzle to the workpiece.

2. The wire electrical discharge machining apparatus according to claim 1, wherein said nozzle is constructed with a double structure, the working fluid in the state of the gas-liquid mixed phase is jetted out from an internal nozzle, and the working fluid in which the gas is not mixed is jetted out from an external nozzle.

3. A wire electrical discharge machining apparatus in which a working fluid is interposed between a wire electrode and a workpiece to machine the workpiece by electrical discharge, comprising:

an upper guide and a lower guide which are respectively disposed above and below the workpiece and respectively incorporate wire guides for guiding said wire electrode;

a nozzle for jetting and supplying the working fluid from at least one of said upper guide and said lower guide toward the workpiece; and a pump for supplying the working fluid to said nozzle, wherein a gas is mixed into the working fluid inside a cooling container disposed on an upstream side of said pump, and the working fluid in a state of a gas-liquid mixed phase is jetted and supplied from said nozzle to the workpiece.

4. The wire electrical discharge machining apparatus according to claim 3, wherein said nozzle is constructed with a double structure, the working fluid in the state of the gas-liquid mixed phase is jetted out from an internal nozzle, and the working fluid in which the gas is not mixed is jetted out from an external nozzle.

* * * * *